(12) United States Patent
Takemori

(10) Patent No.: US 12,337,619 B2
(45) Date of Patent: Jun. 24, 2025

(54) TIRE

(71) Applicant: The Yokohama Rubber Co., LTD., Tokyo (JP)

(72) Inventor: Ryohei Takemori, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 149 days.

(21) Appl. No.: 17/905,388

(22) PCT Filed: Dec. 21, 2020

(86) PCT No.: PCT/JP2020/047737
§ 371 (c)(1),
(2) Date: Aug. 31, 2022

(87) PCT Pub. No.: WO2021/176806
PCT Pub. Date: Sep. 10, 2021

(65) Prior Publication Data
US 2023/0061615 A1    Mar. 2, 2023

(30) Foreign Application Priority Data
Mar. 5, 2020    (JP) .................. 2020-038217

(51) Int. Cl.
*B60C 11/03*    (2006.01)
*B60C 11/13*    (2006.01)

(52) U.S. Cl.
CPC ...... *B60C 11/1323* (2013.01); *B60C 11/0304* (2013.01); *B60C 11/0327* (2013.01);
(Continued)

(58) Field of Classification Search
CPC ............ B60C 11/0304; B60C 11/1392; B60C 2011/0381; B60C 2011/0348
See application file for complete search history.

(56) References Cited

U.S. PATENT DOCUMENTS

2010/0212792 A1* 8/2010 Mita .................... B60C 11/033
152/209.9
2012/0285592 A1   11/2012 Kameda
(Continued)

FOREIGN PATENT DOCUMENTS

DE    10 2012 104 081 A1    11/2012
DE    11 2014 003 385 T5    3/2016
(Continued)

OTHER PUBLICATIONS

Machine translation for Japan 2010-006096 (Year: 2024).*

*Primary Examiner* — Steven D Maki
(74) *Attorney, Agent, or Firm* — Thorpe North & Western

(57) ABSTRACT

A tire includes first through fourth chamfered portions where tire width direction dimensions change in a tire circumferential direction formed along respective vehicle mounting outer edges of first through fourth circumferential main grooves. A second inclined groove adjacent to a vehicle mounting outermost position of the second chamfered portion is formed. A third inclined groove adjacent to a vehicle mounting outermost position of the third chamfered portion is formed. At least one circumferential narrow groove extending in the tire circumferential direction is formed in at least one of a first land portion and a second land portion.

16 Claims, 3 Drawing Sheets

(52) U.S. Cl.
CPC ............... *B60C 11/1392* (2013.01); *B60C 2011/0346* (2013.01); *B60C 2011/0348* (2013.01); *B60C 2011/0381* (2013.01)

(56) References Cited

U.S. PATENT DOCUMENTS

| | | |
|---|---|---|
| 2016/0159159 A1 | 6/2016 | Horiuchi |
| 2019/0023077 A1 | 1/2019 | Speziari et al. |
| 2020/0148008 A1* | 5/2020 | Nemoto ............ B60C 11/24 |
| 2021/0268840 A1* | 9/2021 | Matsumoto ........ B60C 11/1272 |
| 2021/0268842 A1 | 9/2021 | Matsumoto |
| 2022/0016936 A1 | 1/2022 | Nagahashi |

FOREIGN PATENT DOCUMENTS

| | | | |
|---|---|---|---|
| DE | 11 2019 005 771 T5 | | 8/2021 |
| JP | 2002-240513 A | | 8/2002 |
| JP | 2010-006096 A | * | 1/2010 |
| JP | 2010-215221 A | | 9/2010 |
| JP | 2012-236455 A | | 12/2012 |
| JP | 2013-224132 A | | 10/2013 |
| JP | 6796655 B1 | | 10/2015 |
| JP | 2016-74256 A | | 5/2016 |
| JP | 2016-74390 A | | 5/2016 |
| JP | 2017-39407 A | | 2/2017 |
| WO | WO-2018/235400 A1 | * | 12/2018 |
| WO | WO-2020/009077 A1 | * | 1/2020 |
| WO | WO-2020/012808 A1 | * | 1/2020 |
| WO | WO 2020/013152 A1 | | 1/2020 |

* cited by examiner

TIRE

TECHNICAL FIELD

The present technology relates to a tire with improved wet steering stability, vehicle external noise resistance, and wear resistance in a well-balanced manner.

BACKGROUND ART

Conventionally, various tires with improved wet steering stability and wear resistance have been proposed.

For example, Japan Unexamined Patent Publication No. 2013-224132 A discloses the following pneumatic tire. A region of a tread surface of the pneumatic tire includes four circumferential main grooves extending in a tire circumferential direction, five land portions defined by the circumferential main grooves, first shoulder inclined grooves that are formed in a region of a first side shoulder land portion, from among the land portions, positioned on an outermost in a tire width direction on a first side and extend in the tire width direction, second side shoulder inclined grooves that are formed in a region of a second side shoulder land portion positioned on an outermost in the tire width direction on a second side and extend in the tire width direction, and chamfers formed on an entire periphery of an edge portion where the first side shoulder land portion contacts the first side shoulder inclined grooves and an entire periphery of an edge portion where the second side shoulder land portion contacts the second side shoulder inclined grooves. A ratio W2/W1 that represents a ratio of a groove width W2 of a second circumferential main groove located at the second position when viewed from the first side to a groove width W1 of a first circumferential main groove located at the first position when viewed from the first side from among the four circumferential main grooves ranges from 4 to 5 when W2 is in a range of 16 to 20 mm. A ratio Sin/Sout that represents a ratio of a groove area ratio Sin in a region located on the second side when viewed from a tire centerline to a groove area ratio Sout in a region located on the first side when viewed from the tire centerline in the region of the tread surface ranges from 1.1 to 1.2 when the Sin is in a range of 35.2 to 38.4%.

SUMMARY

In recent years, in addition to wet steering stability and wear resistance, a request level of vehicle external noise resistance is also increasing more and more, and development of a tire with improved these three performances in a well-balanced manner is demanded.

The present technology provides a tire with improved wet steering stability, wear resistance, and vehicle external noise resistance in a well-balanced manner.

A tire according to an embodiment of the present technology has a designated vehicle mounting direction. A first circumferential main groove, a second circumferential main groove, a third circumferential main groove, and a fourth circumferential main groove are formed from a vehicle mounting inner side toward an outer side. The four circumferential main grooves define and form a first land portion, a second land portion, a third land portion, a fourth land portion, and a fifth land portion from the vehicle mounting inner side toward the outer side. A first chamfered portion to a fourth chamfered portion where tire width direction dimensions change in a tire circumferential direction are formed along respective vehicle mounting outer edges of the first circumferential main groove to a fourth circumferential main groove. A second inclined groove adjacent to a vehicle mounting outermost position of the second chamfered portion is formed. A third inclined groove adjacent to a vehicle mounting outermost position of the third chamfered portion is formed. At least one circumferential narrow groove extending in the tire circumferential direction is formed in at least any of the first land portion and the second land portion.

In the tire according to an embodiment of the present technology, the chamfered portions having specific shapes are formed on the vehicle mounting outer edges of the circumferential main grooves and the inclined grooves having specific positional relationship with the chamfered portions are formed. The circumferential narrow groove is formed in the land portion on the vehicle mounting inner side. As a result, the tire according to an embodiment of the present technology allows improved wet steering stability, vehicle external noise resistance, and wear resistance in a well-balanced manner.

DETAILED DESCRIPTION

Hereinafter, tires according to embodiments of the present technology (Basic Embodiment and Additional Embodiments 1 to 9 described later) will be described in detail with reference to the drawings. Note that these embodiments do not limit the present technology. Furthermore, constituents of the embodiment include elements that can be substituted or easily conceived by one skilled in the art or that are essentially identical. In addition, the various embodiments included in the embodiments can be combined as desired within the scope of obviousness by one skilled in the art.

Basic Embodiment

A tire according to Basic Embodiment of the present technology will be described below. In the following description, a tire radial direction refers to a direction orthogonal to a rotation axis of the tire, an inner side in the tire radial direction refers to a side toward the rotation axis in the tire radial direction, and an outer side in the tire radial direction refers to a side away from the rotation axis in the tire radial direction. In addition, a tire circumferential direction refers to a circumferential direction about the rotation axis as a center axis. Moreover, a tire width direction refers to a direction parallel to the rotation axis, an inner side in the tire width direction refers to a side toward a tire equatorial plane (tire equator line) in the tire width direction, and an outer side in the tire width direction refers to a side away from the tire equatorial plane in the tire width direction. Note that the tire equatorial plane CL refers to a plane that is orthogonal to the rotation axis of the tire and passes through the center of the tire width of the tire.

Figure 1:
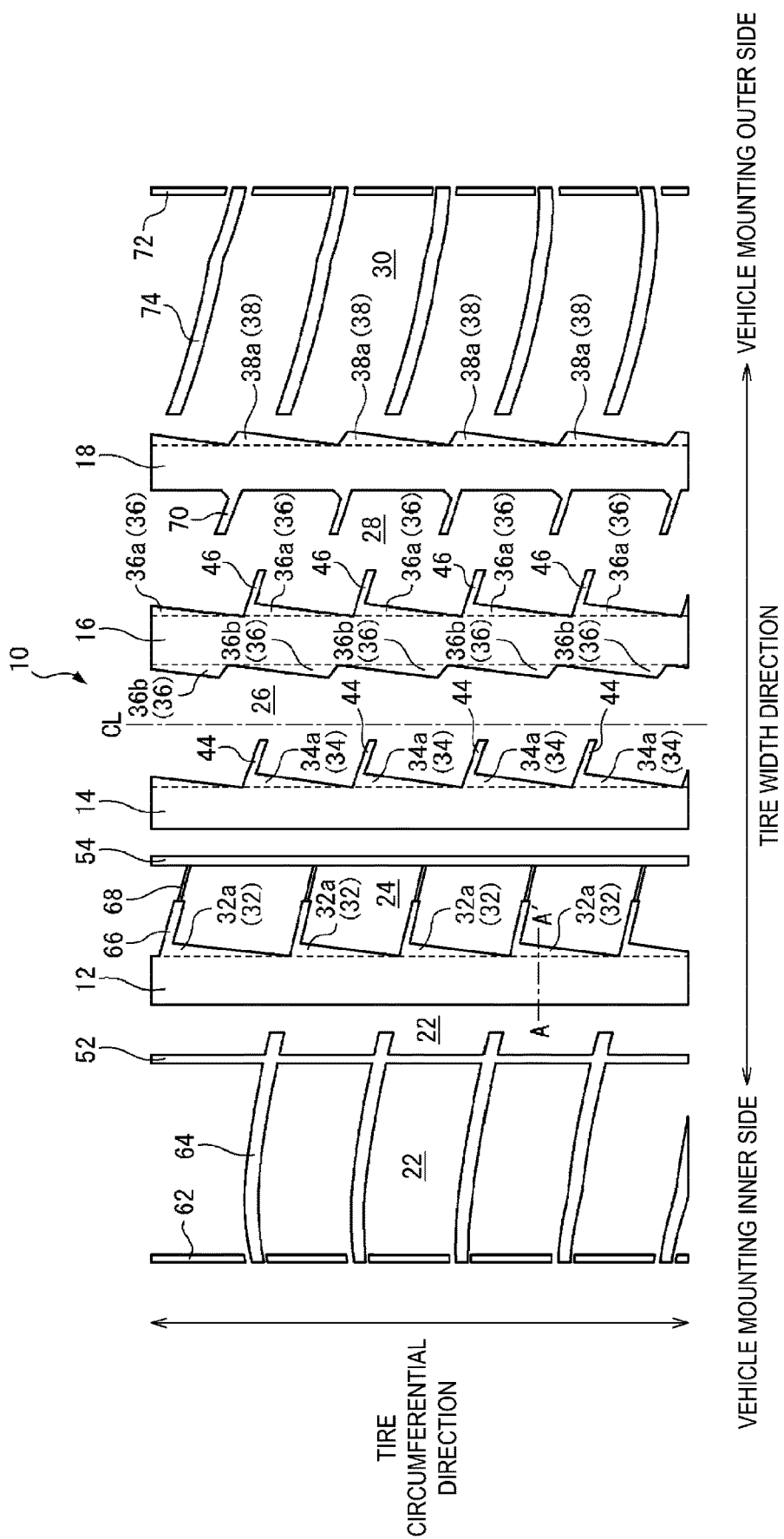
FIG. 1 is a plan view illustrating an example of a tread pattern of a tire according to the present embodiment.

FIG. 1 is a plan view illustrating an example of a tread pattern of a tire according to the present embodiment. A tread surface 10 having the tread pattern illustrated in the drawing has a designated vehicle mounting direction. A first circumferential main groove 12, a second circumferential main groove 14, a third circumferential main groove 16, and a fourth circumferential main groove 18 are formed from a vehicle mounting inner side toward an outer side in the tread surface 10. The four circumferential main grooves 12 to 18 define and form a first land portion 22, a second land portion 24, a third land portion 26, a fourth land portion 28, and a fifth land portion 30 from the vehicle mounting inner side toward the outer side.

FIG. 1 illustrates a shape of each groove in which the tire is mounted on a specified rim, inflated to an internal pressure 5% of a specified internal pressure, and in an unloaded state. In this state, for example, for a tire with a size 235/60R18 103V, groove widths of the first to fourth circumferential main grooves 12 to 18 can be from 8.0 mm to 10.0 mm, groove depths thereof can be from 7.3 mm to 7.5 mm, and intervals thereof can be from 33 mm to 37 mm. Here, the groove width is the maximum dimension in a direction perpendicular to an extension direction of the groove, and the groove depth is the maximum dimension measured in the tire radial direction from a tire profile line to a groove bottom in the case of without a groove (in a tire meridian cross-sectional view).

Here, "specified rim" refers to an "applicable rim" defined by the Japan Automobile Tyre Manufacturers Association (JATMA), a "Design Rim" defined by the Tire and Rim Association (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by the TRA, or to "INFLATION PRESSURES" defined by the ETRTO.

Under such a premise, in the tire according to Basic Embodiment, first chamfered portions 32, second chamfered portions 34, third chamfered portions 36, and fourth chamfered portions 38 where tire width direction dimensions change in the tire circumferential direction are formed along vehicle mounting outer edges of the first circumferential main groove 12, the second circumferential main groove 14, the third circumferential main groove 16, and the fourth circumferential main groove 18 illustrated in FIG. 1, respectively. Note that in FIG. 1, the chamfered portions 32, 34, 38 are portions located vehicle mounting outer sides of the circumferential main grooves 12, 14, 18, respectively. However, the chamfered portions 36 refer to portions located on both vehicle mounting sides of the circumferential main groove 16 and portions on the opposite sides of the respective circumferential main grooves 12 to 18 with respect to the dotted lines in the drawing (note that portions equivalent to inclined grooves described later are not included). Additionally, in the example illustrated in FIG. 1, the respective chamfered portions 32 are formed such that a plurality of tire circumferential units 32a having the same shape are uniformly formed in the tire circumferential direction. Tire circumferential units 34a, 36a, 36b, 38a are similarly formed in the chamfered portions 34, 36, and 38, respectively.

Figure 2:
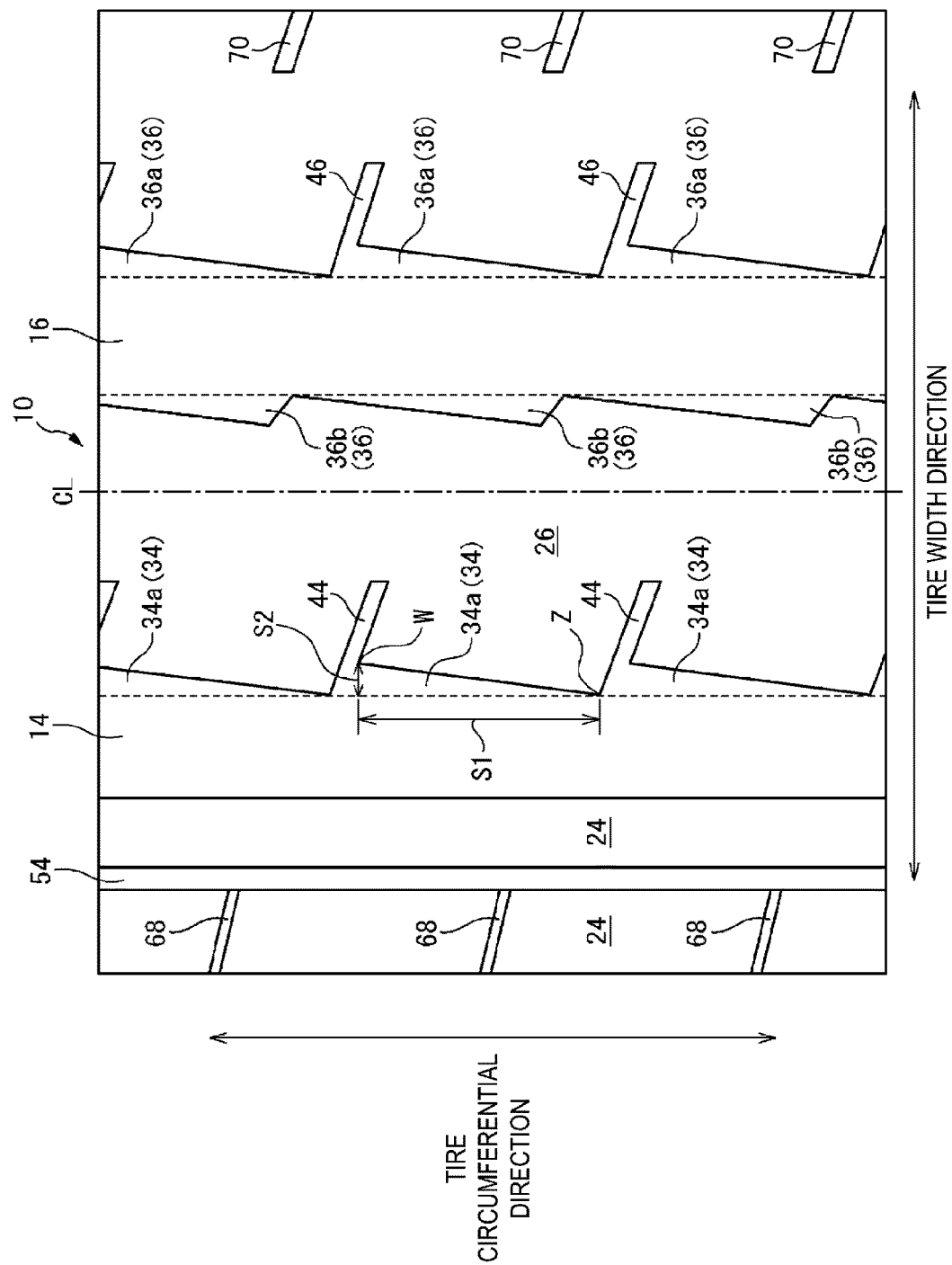
FIG. 2 is a plan view illustrating a center region in a tire width direction in FIG. 1.

Further, in the tire according to Basic Embodiment, a second inclined groove 44 adjacent to a vehicle mounting outermost position of the second chamfered portion 34 illustrated in FIG. 1 is formed, and a third inclined groove 46 adjacent to a vehicle mounting outermost position of the third chamfered portion 36 is formed. Note that FIG. 2 is a plan view illustrating a center region in the tire width direction in FIG. 1, and in particular illustrates the respective components in a tire width direction region between the circumferential main groove 14 and the circumferential main groove 16. Note that, in this specification, a boundary line between the second chamfered portion 34 and the second inclined groove 44 refers to a line formed by extending a boundary line (the solid line in FIG. 2) between the tire circumferential unit 34a and the third land portion 26 toward one side (the upper side in FIG. 2) in the tire circumferential direction and more specifically, a line segment in a section until this line reaches the land portion 26. Further, the concept of this boundary line is similar to both of the boundary line between the first chamfered portions 32 and a first inclined groove 66 and the boundary line between the third chamfered portions 36 and the third inclined groove 46 illustrated in FIG. 1.

Further, in the tire according to Basic Embodiment, at least one (one as illustrated in the drawing) circumferential narrow groove 52, 54 extending in the tire circumferential direction is formed in at least any of the first land portion 22 and the second land portion 24 illustrated in FIG. 1 (both of them as illustrated in the drawing). Note that, for example, in the case of tire with a size of 235/60R18 103V, in the state illustrated in FIG. 1, the circumferential narrow groove 52, 54 can have a groove width of from 1.3 mm to 2.4 mm and a groove depth of from 3.8 mm to 4.2 mm.

The tread surface 10 illustrated in FIG. 1 includes the following components in addition to the respective components 12 to 54 described above. That is, in the first land portion 22, a plurality of circumferential narrow grooves 62 and lug grooves 64 that extend through the circumferential narrow groove 52 from the tire width direction positions of the circumferential narrow grooves 62 toward the vehicle mounting outer side are formed. In the second land portion 24, first inclined grooves 66 adjacent to the first chamfered portions 32 and sipes 68 that communicate with the circumferential narrow groove 54 from vehicle mounting outermost positions of the first inclined grooves 66 toward the vehicle mounting outer side are formed. In the fourth land portion 28, fourth inclined grooves 70 that communicate with the fourth circumferential main groove 18 and terminate in the land portion are formed. In the fifth land portion, a plurality of circumferential narrow grooves 72 and lug grooves 74 that terminate in the land portion from tire width direction positions of the circumferential narrow grooves 72 toward the vehicle mounting inner side are formed.

Effects

Conventionally, in order to improve wet steering stability and wear resistance, a groove width ratio between circumferential main grooves formed on the vehicle mounting outer side and a groove area ratio between the vehicle mounting outer side and the vehicle mounting inner side have been enhanced (Japan Unexamined Patent Publication No. 2013-224132 A). However, in recent years, in addition to the performances, improvement in vehicle external noise resistance has also been demanded.

In the first place, a volume of a groove generally dominantly affects vehicle external noise resistance. When grooves having the same volume are formed, when grooves having small groove widths are formed on the vehicle mounting outer side more than the vehicle mounting inner side, excellent vehicle external noise resistance is achieved. In the tread pattern illustrated in FIG. 2 of Japan Unexamined Patent Publication No. 2013-224132 A, groove areas between lug grooves formed in shoulder portions do not substantially differ between a vehicle mounting inner side and a vehicle mounting outer side with a tire equatorial plane interposed therebetween, but a circumferential main groove on the vehicle mounting outer side has the widest groove.

The present inventor focused on this point and diligently examined, for example, an arrangement configuration of grooves extending in a circumferential direction (a circumferential main groove and a circumferential narrow groove having a groove width smaller than that of the circumferential main groove) and a shape of chamfered portions formed adjacent to the grooves to enhance vehicle external noise resistance. Note that, in examination of, for example, the arrangement configuration, the present inventor diligently examined a tread pattern that allowed achieving drainage properties (furthermore wet steering stability) and wear resistance equivalent to one obtained by the tread pattern of Japan Unexamined Patent Publication No. 2013-224132 A or more.

As a result, in the tire of the present embodiment, as illustrated in FIG. 1, the first chamfered portion 32 to the fourth chamfered portion 38 where the tire width direction dimensions change in the tire circumferential direction are formed along vehicle mounting outer edges of the first circumferential main groove 12 to the fourth circumferential main groove 18, respectively. Thus changing the tire width direction dimensions of the chamfered portions 32 to 38 (for example, changing them to have zigzag shapes) further allows providing an effect equivalent to the vehicle external noise resistance of Japan Unexamined Patent Publication No. 2013-224132 A without excessively increasing an average dimension in tire width direction of the chamfered portions (operational effect 1). In addition, the configuration allows providing an effect equivalent to the wear resistance of Japan Unexamined Patent Publication No. 2013-224132 A without excessively increasing the average dimension in tire width direction of the chamfered portions and further without decreasing the rigidity of land portions close to the chamfered portions (operational effect 2).

In addition, by changing the tire width direction dimensions of the chamfered portions 32 to 38, the effects of drainage properties and further wet steering stability equivalent to those of Japan Unexamined Patent Publication No. 2013-224132 A can be provided without excessively decreasing the average dimension in tire width direction of the chamfered portions (operational effect 3).

Next, in the tire of the present embodiment, as illustrated in FIGS. 1 and 2, the second inclined groove 44 adjacent to the vehicle mounting outermost position of the second chamfered portion 34 is formed, and the third inclined groove 46 adjacent to the vehicle mounting outermost position of the third chamfered portion 36 is formed. Thus, the effects of drainage properties and further wet steering stability equivalent to those of Japan Unexamined Patent Publication No. 2013-224132 A can be provided (operational effect 4).

Further, in the tire according to the present embodiment, at least one of (one as illustrated in the drawing) circumferential narrow groove 52, 54 extending in the tire circumferential direction is formed in at least any of the first land portion 22 and the second land portion 24 as illustrated in FIG. 1 (both of them as illustrated in the drawing). By thus forming the circumferential narrow grooves 52, 54 having the narrow groove widths on the vehicle mounting inner side, the grooves extending in the tire circumferential direction (the circumferential main grooves 12 to 18 and the circumferential narrow grooves 52, 54) can be formed on the vehicle mounting inner side more than the vehicle mounting outer side. In view of this, in a case of forming grooves having the same volume, in consideration of ensuring obtaining excellent discharge efficiency through formation of the many grooves on the vehicle mounting inner side, drainage properties can be efficiently increased compared to that of the tread pattern of Japan Unexamined Patent Publication No. 2013-224132 A, and as a result, wet steering stability can be improved (operational effect 5). In addition, in a case of forming grooves having the same volume, in consideration of ensuring obtaining excellent vehicle external noise resistance through formation of the many grooves on the vehicle mounting inner side, vehicle external noise resistance can be efficiently increased compared to that of the tread pattern of Japan Unexamined Patent Publication No. 2013-224132 A (operational effect 6).

As described above, in the tire according to Basic Embodiment, assuming that the chamfered portions having the specific shapes are formed on the vehicle mounting outer edges of the circumferential main grooves and the inclined grooves having the specific positional relationship with the chamfered portions are formed, the circumferential narrow grooves are formed in the land portion on the vehicle mounting inner side. Thus, in combination of the operational effect 1 to the operational effect 6, in addition to wear resistance equivalent to the pattern of Japan Unexamined Patent Publication No. 2013-224132 A is achieved, compared to Japan Unexamined Patent Publication No. 2013-224132 A, wet steering stability and vehicle external noise resistance can be enhanced, and further wet steering stability, vehicle external noise resistance, and wear resistance can be improved in a well-balanced manner.

Note that the tire according to Basic Embodiment described above has a meridian cross-section shape (not illustrated) similar to that of a conventional tire. Here, the meridian cross-section shape of the tire refers to the cross-sectional shape of the tire as it appears on a plane perpendicular to the tire equatorial plane CL. In the tire meridian cross-sectional view, the tire according to Basic Embodiment includes bead portions, sidewall portions, shoulder portions, and a tread portion in that order from the inner side to the outer side in the tire radial direction. Also, in the tire meridian cross-sectional view, for example, the tire includes a carcass layer extending from the tread portion to the bead portions on both sides and wound around a pair of bead cores, and a belt layer and a belt reinforcing layer provided in that order on the carcass layer on the outer side in the tire radial direction.

The tire according to Basic Embodiment described above is obtained through ordinary respective manufacturing steps, that is, for example, a tire material mixing step, a tire material processing step, a green tire molding step, a vulcanization step, and an inspection step after vulcanization. To manufacture the tire according to Basic Embodiment, for example, protrusion portions corresponding to the tread pattern illustrated in FIG. 1 are formed in an inner wall of a vulcanization mold, and vulcanization is performed by using this mold.

Note that the tire according to Basic Embodiment described above can be a pneumatic tire or an airless tire. That is, any tire falls within the scope of the present technology as long as the tire has the features of the tread pattern illustrated in FIG. 1 as an example (the chamfered portions having the specific shapes are formed on the vehicle mounting outer edges of the circumferential main grooves, the inclined grooves having the specific positional relationship with the chamfered portions are formed, and the circumferential narrow grooves are formed in the land portion on the vehicle mounting inner side).

ADDITIONAL EMBODIMENTS

Next, Additional Embodiments 1 to 9 that can optionally be embodied on the above-described Basic Embodiment of the tire according to an embodiment of the present technology will be described.

Additional Embodiment 1

In Basic Embodiment, in the respective first land portion 22 and second land portion 24 illustrated in FIG. 1, when the vehicle mounting innermost position is defined as a 0% tire width direction position and the vehicle mounting outermost position is defined as a 100% tire width direction position, the respective circumferential narrow grooves 52, 54 are preferably formed at 60% or more and 90% or less of the tire width direction positions (Additional Embodiment 1).

Typically, a ground contact pressure of the tire increases from the tire equatorial plane CL toward the outer side in the tire width direction, and the ground contact pressure of one land portion tends to increase from the inner side in the tire width direction toward the outer side. Therefore, rigidity of one land portion is preferably increased in the outer side region more than the inner region in the tire width direction. From these perspectives, in the present embodiment, the respective circumferential narrow grooves 52, 54 are formed at 60% or more of the tire width direction positions, and thus the positions where the circumferential narrow grooves are formed are close to the vehicle mounting outer side (the inner side in the tire width direction) in the land portions 22, 24, and the rigidity of the outer side regions in the tire width direction in the land portions 22, 24 can be increased. As a result, not only wet steering stability can be further enhanced, but also dry steering stability can be enhanced.

In contrast, formation of the respective circumferential narrow grooves 52, 54 at 90% or less of the tire width direction positions allows suppressing the decrease in rigidity in the tire width direction region interposed between the circumferential narrow groove 52 and the circumferential main groove 12 and the tire width direction region interposed between the circumferential narrow groove 54 and the circumferential main groove 14. As a result, not only wet steering stability can be further enhanced, but also dry steering stability can be enhanced. In addition, according to the configuration, the circumferential narrow grooves 52, 54 are not provided excessively on the vehicle mounting outer side, and thus vehicle external noise resistance can be further enhanced.

Formation of the circumferential narrow grooves 52, 54 at 65% or more and 85% or less of the tire width direction positions, respectively, provides the above respective effects at further high levels, which is further preferred. Formation of the circumferential narrow grooves 52, 54 at 70% or more and 75% or less of the tire width direction positions, respectively, provides the above respective effects at further high levels, which is extremely preferred.

Additional Embodiment 2

In Basic Embodiment or an embodiment in which Additional Embodiment 1 is added to Basic Embodiment, as illustrated in FIG. 1, the circumferential narrow grooves 52, 54 are preferably formed in both of the first land portion 22 and a second land portion 24 (Additional Embodiment 2).

When the circumferential narrow grooves 52, 54 are formed in both of the first land portion 22 and the second land portion 24, the effects described in detail in Basic Embodiment are provided at a further high level. Note that, in a case where only one circumferential narrow groove 52, 54 is provided to increase the land portion rigidity from the tire equatorial plane CL to the vehicle mounting inner side, providing only the circumferential narrow groove 54 is more preferred from the perspective of improving drainage properties.

Additional Embodiment 3

In Basic Embodiment or an embodiment in which at least any of Additional Embodiments 1, 2 is added to Basic Embodiment, a ratio of a tire width direction dimension L1 of the first inclined groove 66 to a tire width direction dimension W2 of the second land portion 24 illustrated in FIG. 1 (L1/W2) is preferably 0.40 or more and 0.50 or less (Additional Embodiment 3). Here, in the present specification, the tire width direction dimension of the land portion means the tire width direction dimension between the innermost position in the tire width direction and the outermost position in the tire width direction of the land portion, and the two positions need not to be at the same position in the tire circumferential direction. Additionally, in the present specification, the tire width direction dimension of the groove means the tire width direction dimension between the innermost position in the tire width direction and the outermost position in the tire width direction of the groove, and the two positions need not to be at the same position in the tire circumferential direction. Furthermore, in this specification, the chamfered portion has a concept not included in the groove.

By setting the ratio (L1/W2) to 0.40 or more, the tire width direction dimension (further a groove area) of the first inclined groove 66 can be further largely ensured, and drainage properties and further wet steering stability can be further enhanced.

In contrast, by setting the ratio (L1/W2) to be 0.50 or less, it is possible to further increase vehicle external noise resistance without excessively increasing the tire width direction dimension (further the groove area) of the first inclined groove 66.

Setting the ratio (L1/W2) to be 0.42 or more and 0.48 or less is further preferable because the above respective effects are provided at further high levels, and setting the ratio to be 0.43 or more and 0.47 or less is extremely preferable because the above respective effects are provided at further high levels.

Additional Embodiment 4

In Basic Embodiment or an embodiment in which at least any of Additional Embodiments 1 to 3 is added to Basic Embodiment, a ratio of a tire width direction dimension L2 of the second inclined groove 44 to a tire width direction dimension W3 of the third land portion 26 illustrated in FIG. 1 (L2/W3) is preferably 0.35 or more and 0.45 or less (Additional Embodiment 4).

By setting the ratio (L2/W3) to 0.35 or more, the tire width direction dimension (further a groove area) of the second inclined groove 44 can be further largely ensured, and drainage properties and further wet steering stability can be further enhanced.

In contrast, by setting the ratio (L2/W3) to be 0.45 or less, it is possible to further increase vehicle external noise resistance without excessively increasing the tire width direction dimension (further the groove area) of the second inclined groove 44.

Setting the ratio (L2/W3) to be 0.37 or more and 0.43 or less is further preferable because the above respective effects are provided at further high levels, and setting the ratio to be 0.38 or more and 0.42 or less is extremely preferable because the above respective effects are provided at further high levels.

Additional Embodiment 5

In Basic Embodiment or an embodiment in which at least any of Additional Embodiments 1 to 4 is added to Basic Embodiment, a ratio of a tire width direction dimension L3 of the third inclined groove 46 to a tire width direction dimension W4 of the fourth land portion 28 illustrated in FIG. 1 (L3/W4) is preferably 0.30 or more and 0.40 or less (Additional Embodiment 5).

By setting the ratio (L3/W4) to be 0.30 or more, the tire width direction dimension (further a groove area) of the third inclined groove 46 can be further largely ensured, and drainage properties and further wet steering stability can be further enhanced.

In contrast, by setting the ratio (L3/W4) to be 0.40 or less, it is possible to further increase vehicle external noise resistance without excessively increasing the tire width direction dimension (further the groove area) of the third inclined groove 46.

Setting the ratio (L3/W4) to be 0.32 or more and 0.38 or less is further preferable because the above respective effects are provided at further high levels, and setting the ratio to be 0.33 or more and 0.37 or less is extremely preferable because the above respective effects are provided at further high levels.

Additional Embodiment 6

In Basic Embodiment or an embodiment in which at least any of Additional Embodiments 1 to 5 is added to Basic Embodiment, ratios of depths (HC/HG illustrated in FIG. 3 as an example) of the first chamfered portion to the fourth chamfered portion (32, 34, 36, 38) to depths of the first circumferential main groove to the fourth circumferential main groove (12, 14, 16, 18) illustrated in FIG. 1, respectively, are preferably 0.30 or more and 0.50 or less (Additional Embodiment 6).

Figure 3:
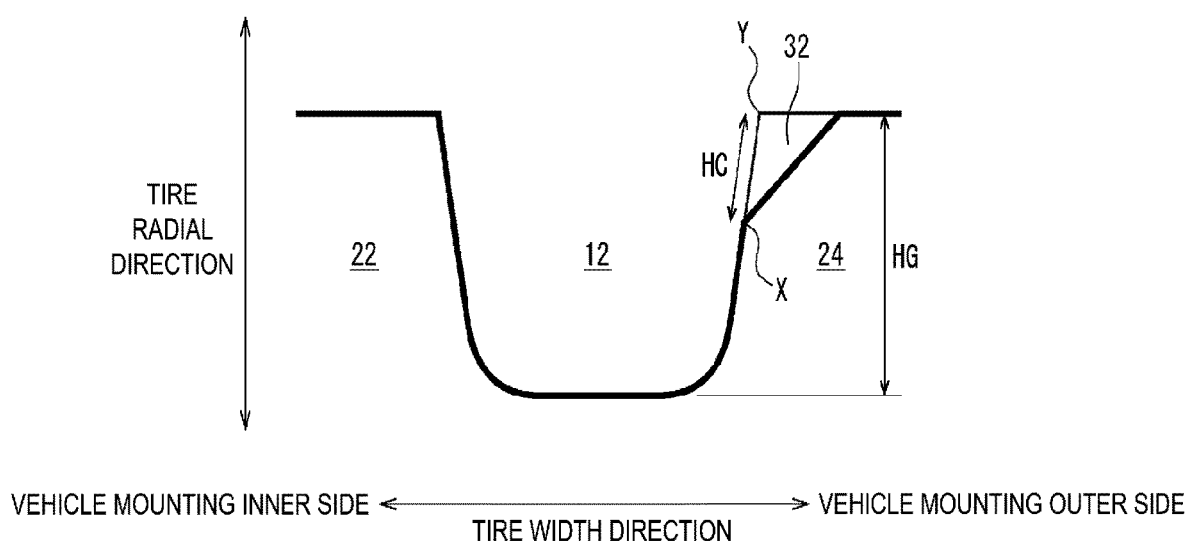
FIG. 3 is a cross-sectional view of a circumferential main groove and a chamfered portion illustrated in FIG. 1 taken along A-A'.

FIG. 3 is a cross-sectional view of the circumferential main groove 12 and the chamfered portion 32 taken along A-A' illustrated in FIG. 1. As illustrated in the drawing, the depth HG of the circumferential main groove 12 refers to the tire radial direction dimension from the maximum position in the tire radial direction of the land portion 24 adjacent to the vehicle mounting outer side of the circumferential main groove 12 to the groove bottom (the innermost position in the tire radial direction) of the circumferential main groove 12. The depth HC of the chamfered portion 32 refers to a dimension from a boundary position X between the circumferential main groove 12 and the chamfered portion 32 measured along a straight line, which is an extension of a profile of the circumferential main groove 12 toward the outer side in the tire radial direction, to a maximum position Y in the tire radial direction of the land portion 24. Note that while FIG. 3 illustrates the circumferential main groove 12 and its circumference in the tire width direction, similarly to one illustrated in the drawing, the depth of the circumferential main groove 12 and the depth of the chamfered portion are defined and further its ratio (HC/HG) is applied to the circumferential main groove 14 and its circumference in the tire width direction, the circumferential main groove 16 and its circumference in the tire width direction, and the circumferential main groove 18 and its circumference in the tire width direction.

By setting the ratio (HC/HG) to 0.30 or more, the depth of each of the circumferential main grooves 12 to 18 can be further largely ensured to enhance drainage properties, and further wet steering stability can be further enhanced.

In contrast, by setting the ratio (HC/HG) to be 0.50 or less, the decrease in rigidity of the land portions adjacent to the respective chamfered portions 32 to 38 can be suppressed without excessively increasing the depths of the respective chamfered portions 32 to 38. As a result, not only wet steering stability can be further enhanced, but also dry steering stability can be enhanced. In addition, according to the configuration, it is possible to further increase vehicle external noise resistance without excessively increasing the depth of each of the chamfered portions 32 to 38.

Setting the ratio (HC/HG) to be 0.35 or more and 0.45 or less is further preferable because the above respective effects are provided at further high levels, and setting the ratio to be 0.37 or more and 0.43 or less is extremely preferable because the above respective effects are provided at further high levels.

Additional Embodiment 7

In Basic Embodiment or an embodiment in which at least any of Additional Embodiments 1 and 6 is added to Basic Embodiment, as illustrated in FIG. 1, when at least any of the first chamfered portion 32 to the fourth chamfered portion 38 (all of the chamfered portions 32, 34, 36, 38 in the drawing) is configured by the plurality of tire circumferential units (for example, the case where the chamfered portions 34 illustrated in FIG. 2 are configured by the plurality of tire circumferential units 34a), as illustrated in FIG. 2, a ratio (S2/S1) of a tire width direction dimension S2 to a tire circumferential direction dimension S1 of the tire circumferential unit 34a is preferably 0.05 or more and 0.10 or less (Additional Embodiment 7).

Here, as illustrated in FIG. 2, the tire circumferential direction dimension S1 of the tire circumferential unit 34a means the tire circumferential direction dimension between a boundary point Z between the chamfered portion 34 and the circumferential main groove 14 and a boundary point W between the chamfered portion 34 and the inclined groove 44, and the tire width direction dimension S2 of the tire circumferential unit 34a means the tire width direction dimension between the two boundary points Z, W. Note that FIG. 2 illustrates the region including the chamfered portion 34 and the inclined groove 44 with signs. Similarly to the one illustrated in FIG. 2, the ratio (S2/S1) is also applied to the region including the chamfered portion 32 and the inclined groove 66 and the region including the chamfered portion 36 and the inclined groove 46 illustrated in FIG. 1. Also, in the region including the chamfered portion 38 illustrated in FIG. 1 (the region not including the inclined groove), S1 is applied to the tire circumferential direction dimension from the tire circumferential direction position where the tire width direction dimension is the maximum to the tire circumferential direction position where the tire width direction dimension is zero of the tire circumferential unit 38a that constitutes the chamfered portion 38, and S2 is applied to the maximum dimension in tire width direction of the tire circumferential unit 38a.

In the present embodiment, for example, like the chamfered portions 34 illustrated in FIG. 2, the case where the plurality of tire circumferential units 34a, 34a constituting the chamfered portions 34 are formed between which gaps are hardly interposed in the tire circumferential direction and the case where the tire circumferential units 34a, 34a are connected in the tire circumferential direction are assumed. That is, in the present embodiment, it is assumed that the tire circumferential direction dimensions of the tire circumferential units 34a in the tire circumferential direction constituting the chamfered portions 34 are fixed to some extent. In such a case, by setting the ratio (S2/S1) to 0.05 or more, the area of each of the chamfered portions 32 to 38 can be further largely ensured to enhance drainage properties, and further wet steering stability can be further enhanced.

In contrast, by setting the ratio (S2/S1) to be 0.10 or less, the decrease in rigidity of the land portions adjacent to the respective chamfered portions 32 to 38 can be suppressed without excessively increasing the areas of the respective chamfered portions 32 to 38. As a result, not only wet steering stability can be further enhanced, but also dry steering stability can be enhanced. In addition, according to such a configuration, it is possible to further increase vehicle external noise resistance without excessively increasing the area of each of the chamfered portions 32 to 38.

Setting the ratio (S2/S1) to be 0.06 or more and 0.09 or less is further preferable because the above respective effects are provided at further high levels, and setting the ratio to be 0.065 or more and 0.085 or less is extremely preferable because the above respective effects are provided at further high levels.

Additional Embodiment 8

In Basic Embodiment or an embodiment in which at least any of Additional Embodiments 1 and 7 is added to Basic Embodiment, in the case where the circumferential narrow groove formed in the first land portion 22 is configured as the first circumferential narrow groove 52 and the circumferential narrow groove formed in the second land portion 24 is configured as the second circumferential narrow groove 54 as illustrated in FIG. 1, at least any of the ratio of the groove width of the first circumferential narrow groove 52 to the groove width of the first circumferential main groove 12 and the ratio of the groove width of the second circumferential narrow groove 54 to the groove width of the second circumferential main groove 14 is preferably 0.15 or more and 0.30 or less (Additional Embodiment 8).

By setting the ratio of the groove width of the circumferential narrow groove to the groove width of the circumferential main groove described above (hereinafter referred to as the "ratio of the narrow groove width to the main groove width") to 0.15 or more, the groove area of each of the circumferential narrow grooves 52, 54 can be further largely ensured to enhance drainage properties, and further wet steering stability can be further enhanced.

In contrast, by setting the ratio of the narrow groove width to the main groove width to be 0.30 or less, the decrease in rigidity of the land portions adjacent to the groove areas of the respective circumferential narrow grooves 52, 54 can be suppressed without excessively increasing the groove areas of the respective circumferential narrow grooves 52, 54. As a result, not only wet steering stability can be further enhanced, but also dry steering stability can be enhanced. In addition, according to such a configuration, it is possible to further increase vehicle external noise resistance without excessively increasing the groove area of each of the circumferential narrow grooves 52, 54.

Setting the ratio of the narrow groove width to the main groove width to be 0.17 or more and 0.28 or less is further preferable because the above respective effects are provided at further higher levels, and setting the ratio to be 0.18 or more and 0.27 or less is extremely preferable because the above respective effects are provided at further high levels.

Additional Embodiment 9

In Basic Embodiment or an embodiment in which at least any of Additional Embodiments 1 to 8 is added to Basic Embodiment, at least any of the first circumferential narrow groove 52 and the second circumferential narrow groove 54 illustrated in FIG. 1 preferably has the groove width of 1.5 mm or more and 3.0 or less, and/or at least any of the first circumferential narrow groove 52 and the second circumferential narrow groove 54 preferably has the groove depth of 3.0 mm or more and 4.0 mm or less (Additional Embodiment 9).

By setting the groove width of at least any of the first circumferential narrow groove 52 and the second circumferential narrow groove 54 to be 1.5 mm or more and/or the groove depth of at least any of the first circumferential narrow groove 52 and the second circumferential narrow groove 54 to be 3.0 mm or more, the groove volume of each of the circumferential narrow grooves 52, 54 can be further largely ensured to enhance drainage properties, and further wet steering stability can be further enhanced.

In contrast, by setting the groove width of at least any of the first circumferential narrow groove 52 and the second circumferential narrow groove 54 to be 3.0 mm or less and/or the groove depth of at least any of the first circumferential narrow groove 52 and the second circumferential narrow groove 54 to be 4.0 mm or less, the decrease in rigidity of the land portions adjacent to the groove areas of the respective circumferential narrow grooves 52, 54 can be suppressed without excessively increasing the groove volumes of the respective circumferential narrow grooves 52, 54. As a result, not only wet steering stability can be further enhanced, but also dry steering stability can be enhanced. In addition, according to such a configuration, it is possible to further increase vehicle external noise resistance without excessively increasing the groove volume of each of the circumferential narrow grooves 52, 54.

Note that setting the groove width of at least any of the first circumferential narrow groove 52 and the second circumferential narrow groove 54 to be 1.7 mm or more and/or the groove depth of at least any of the first circumferential narrow groove 52 and the second circumferential narrow groove 54 to be 3.2 mm or more allows further increasing wet steering stability. In addition, setting the groove width of at least any of the first circumferential narrow groove 52 and the second circumferential narrow groove 54 to be 2.8 mm or less and/or the groove depth of at least any of the first circumferential narrow groove 52 and the second circumferential narrow groove 54 to be 3.8 mm or less allows further enhancing vehicle external noise resistance, in addition to wet steering stability and dry steering stability.

EXAMPLES

The following examples were performed using pneumatic tires.

Tires according to Inventive Examples 1 to 10 having tire sizes of 235/60R18 103V and the tread patterns illustrated in FIG. 1 (or tread patterns similar to the tread pattern illustrated in FIG. 1) and a tire according to Conventional Example (equivalent to the pneumatic tire described in Japan Unexamined Patent Publication No. 2013-224132 A) were manufactured. Note that the detailed conditions of these tires are as shown in Tables 1 and 2 below.

In Table 1 and Table 2, all of the positions and the number of circumferential narrow grooves, the tire width direction position of the circumferential narrow groove in the land portion, the ratio (L1/W2), the ratio (L2/W3), the ratio (L3/W4), the ratio (HC/HG), the ratio (S2/S1), the ratio of the narrow groove width to the main groove width, and the groove width (mm) of the circumferential narrow groove are in accordance with the matters described in this Specification. Note that the circumferential narrow groove in Conventional Example refers to a groove 58 illustrated in FIG. 2 of Japan Unexamined Patent Publication No. 2013-224132 A.

The tires according to Inventive Examples 1 to 10 and the tire according to Conventional Example thus manufactured were mounted on 7J rims made of aluminum at 230 kPa, each test tire was mounted on an FR test vehicle (displacement: 2500 cc), and wet steering stability, vehicle external noise resistance, and wear resistance were evaluated in accordance with the following points.

Wet Steering Stability

Sensory evaluation by a test driver when a test course of a wet surface (a water film of 1 mm) was traveled by a vehicle on which respective test tires were mounted was performed. The results were expressed as index values and evaluated with the Conventional Example being assigned as the reference (100). The evaluation results are shown in Tables 1 and 2. In the evaluation, larger index values indicate superior wet steering stability.

Vehicle External Noise Resistance

A pass noise (dB) when a test course of a standard road surface (ISO road surface) normalized as a noise test road surface of a vehicle was traveled at 80 km/h was measured as a vehicle external noise. For vehicle external noise resistance, the reciprocal of the measurement value of the pass noise was calculated and evaluated, with the Conventional Example being assigned as the reference value (100). The evaluation results are shown in Tables 1 and 2. In the evaluation, larger index values indicate superior vehicle external noise resistance.

Wear Resistance

For a test vehicle, a difference in an amount of wear (heel and toe wear) in each land portion after pattern traveling of 10000 km was measured, and the reciprocal of the measurement value was calculated. The calculated results were expressed as index values and evaluated with the Conventional Example being assigned as the reference (100). The evaluation results are shown in Tables 1 and 2. In the evaluation, larger index values indicate superior wear resistance.

TABLE 1

|  | Conventional Example | Inventive Example 1 | Inventive Example 2 | Inventive Example 3 | Inventive Example 4 | Inventive Example 5 |
|---|---|---|---|---|---|---|
| Position and the number of circumferential narrow grooves | One in the vehicle mounting inner side | One in the vehicle mounting inner side | One in the vehicle mounting inner side | Two in the vehicle mounting inner side | Two in the vehicle mounting inner side | Two in the vehicle mounting inner side |
| Position in the tire width direction of the circumferential narrow groove in the land portion | 33% | 55% | 75% | 75% | 75% | 75% |
| Ratio (L1/W2) | — | 0.35 | 0.35 | 0.35 | 0.45 | 0.45 |
| Ratio (L2/W3) | — | 0.30 | 0.30 | 0.30 | 0.30 | 0.40 |
| Ratio (L3/W4) | — | 0.25 | 0.25 | 0.25 | 0.25 | 0.25 |
| Ratio (HC/HG) | — | 0.25 | 0.25 | 0.25 | 0.25 | 0.25 |
| Ratio (S2/S1) | — | 0.03 | 0.03 | 0.03 | 0.03 | 0.03 |
| Ratio of the narrow groove width to the main groove width | 0.1 | 0.10 | 0.10 | 0.10 | 0.10 | 0.10 |
| Groove width of circumferential narrow groove (mm) | 1.3 | 1.3 | 1.3 | 1.3 | 1.3 | 1.3 |
| Wet steering stability | 100 | 101 | 102 | 103 | 104 | 105 |
| Vehicle external noise resistance | 100 | 101 | 101 | 101 | 101 | 101 |
| Wear resistance | 100 | 100 | 100 | 100 | 100 | 100 |

TABLE 2

|  | Conventional Example | Inventive Example 6 | Inventive Example 7 | Inventive Example 8 | Inventive Example 9 | Inventive Example 10 |
|---|---|---|---|---|---|---|
| Position and the number of circumferential narrow grooves | One in the vehicle mounting inner side | Two in the vehicle mounting inner side | Two in the vehicle mounting inner side | Two in the vehicle mounting inner side | Two in the vehicle mounting inner side | Two in the vehicle mounting inner side |
| Position in the tire width direction of the circumferential narrow groove in the land portion | 33% | 75% | 75% | 75% | 75% | 75% |

TABLE 2-continued

|  | Conventional Example | Inventive Example 6 | Inventive Example 7 | Inventive Example 8 | Inventive Example 9 | Inventive Example 10 |
|---|---|---|---|---|---|---|
| Ratio (L1/W2) | — | 0.45 | 0.45 | 0.45 | 0.45 | 0.45 |
| Ratio (L2/W3) | — | 0.40 | 0.40 | 0.40 | 0.40 | 0.40 |
| Ratio (L3/W4) | — | 0.35 | 0.35 | 0.35 | 0.35 | 0.35 |
| Ratio (HC/HG) | — | 0.25 | 0.35 | 0.35 | 0.35 | 0.35 |
| Ratio (S2/S1) | — | 0.03 | 0.03 | 0.07 | 0.07 | 0.07 |
| Ratio of the narrow groove width to the main groove width | 0.10 | 0.10 | 0.10 | 0.10 | 0.20 | 0.20 |
| Groove width of circumferential narrow groove (mm) | 1.3 | 1.3 | 1.3 | 1.3 | 1.3 | 1.8 |
| Wet steering stability | 100 | 106 | 107 | 108 | 109 | 110 |
| Vehicle external noise resistance | 100 | 101 | 101 | 101 | 101 | 101 |
| Wear resistance | 100 | 100 | 100 | 100 | 100 | 100 |

According to Table 1 and Table 2, it is found that compared with the tire of the conventional example, which does not belong to the technical scope of the present technology, all of the tires of Inventive Examples 1 to 10 that belong to the technical scope of the present technology (that is, the chamfered portions having the specific shapes are formed on the vehicle mounting outer edges of the circumferential main grooves, the inclined grooves having the specific positional relationship with the chamfered portions are formed, and further the circumferential narrow grooves are formed in the land portions on the vehicle mounting inner side), wet steering stability, vehicle external noise resistance, and wear resistance are improved in a well-balanced manner.

The invention claimed is:

1. A tire having a designated vehicle mounting direction, a first circumferential main groove, a second circumferential main groove, a third circumferential main groove, and a fourth circumferential main groove being formed from a vehicle mounting inner side toward an outer side, the four circumferential main grooves defining and forming a first land portion, a second land portion, a third land portion, a fourth land portion, and a fifth land portion from the vehicle mounting inner side toward the outer side,
  a first chamfered portion to a fourth chamfered portion where tire width direction dimensions change in a tire circumferential direction being formed along respective vehicle mounting outer edges of the first circumferential main groove to the fourth circumferential main groove,
  a fifth chamfered portion where tire width direction dimensions change in the tire circumferential direction being formed along a vehicle mounting inner edge of the third circumferential main groove,
  a second inclined groove adjacent to a vehicle mounting outermost position of the second chamfered portion being formed, a third inclined groove adjacent to a vehicle mounting outermost position of the third chamfered portion being formed, and
  at least one circumferential narrow groove extending in the tire circumferential direction being formed in at least any of the first land portion and the second land portion, wherein
  ratios of depths of the first chamfered portion to the fourth chamfered portion to depths of the respective first circumferential main groove to the fourth circumferential main groove are 0.37 or more and 0.50 or less.

2. The tire according to claim 1, wherein in the respective first land portion and second land portion, when a vehicle mounting innermost position is defined as a 0% tire width direction position and a vehicle mounting outermost position is defined as a 100% tire width direction position, the respective circumferential narrow grooves are formed at 60% or more and 90% or less of the tire width direction positions.

3. The tire according to claim 2, wherein the circumferential narrow grooves are formed in both of the first land portion and the second land portion.

4. The tire according to claim 3, wherein a ratio of a tire width direction dimension L1 of the first inclined groove to a tire width direction dimension W2 of the second land portion (L1/W2) is 0.40 or more and 0.50 or less.

5. The tire according to claim 4, wherein a ratio of a tire width direction dimension L2 of the second inclined groove to a tire width direction dimension W3 of the third land portion (L2/W3) is 0.35 or more and 0.45 or less.

6. The tire according to claim 5, wherein a ratio of a tire width direction dimension L3 of the third inclined groove to a tire width direction dimension W4 of the fourth land portion (L3/W4) is 0.30 or more and 0.40 or less.

7. The tire according to claim 6, wherein when at least any of the first chamfered portion to the fourth chamfered portion is configured by a plurality of tire circumferential units, a ratio of a tire width direction dimension to a tire circumferential direction dimension of the tire circumferential unit is 0.05 or more and 0.10 or less.

8. The tire according to claim 7, wherein when the circumferential narrow groove formed in the first land portion is configured as a first circumferential narrow groove and the circumferential narrow groove formed in the second land portion is configured as a second circumferential narrow groove, at least any of a ratio of a groove width of the first circumferential narrow groove to a groove width of the first circumferential main groove and a ratio of a groove width of the second circumferential narrow groove to a groove width of the second circumferential main groove is 0.15 or more and 0.30 or less.

9. The tire according to claim 8, wherein at least any of the first circumferential narrow groove and the second circumferential narrow groove has a groove width of 1.5 mm or more and 3.0 or less, and/or at least any of the first circumferential narrow groove and the second circumferential narrow groove has a groove depth of 3.0 mm or more and 4.0 mm or less.

10. The tire according to claim 1, wherein the circumferential narrow grooves are formed in both of the first land portion and the second land portion.

11. The tire according to claim 1, wherein a ratio of a tire width direction dimension L1 of the first inclined groove to a tire width direction dimension W2 of the second land portion (L1/W2) is 0.40 or more and 0.50 or less.

12. The tire according to claim 1, wherein a ratio of a tire width direction dimension L2 of the second inclined groove to a tire width direction dimension W3 of the third land portion (L2/W3) is 0.35 or more and 0.45 or less.

13. The tire according to claim 1, wherein a ratio of a tire width direction dimension L3 of the third inclined groove to a tire width direction dimension W4 of the fourth land portion (L3/W4) is 0.30 or more and 0.40 or less.

14. The tire according to claim 1, wherein when at least any of the first chamfered portion to the fourth chamfered portion is configured by a plurality of tire circumferential units, a ratio of a tire width direction dimension to a tire circumferential direction dimension of the tire circumferential unit is 0.05 or more and 0.10 or less.

15. The tire according to claim 1, wherein when the circumferential narrow groove formed in the first land portion is configured as a first circumferential narrow groove and the circumferential narrow groove formed in the second land portion is configured as a second circumferential narrow groove, at least any of a ratio of a groove width of the first circumferential narrow groove to a groove width of the first circumferential main groove and a ratio of a groove width of the second circumferential narrow groove to a groove width of the second circumferential main groove is 0.15 or more and 0.30 or less.

16. The tire according to claim 1, wherein at least any of the first circumferential narrow groove and the second circumferential narrow groove has a groove width of 1.5 mm or more and 3.0 or less, and/or at least any of the first circumferential narrow groove and the second circumferential narrow groove has a groove depth of 3.0 mm or more and 4.0 mm or less.

* * * * *